United States Patent
Dietzel

(10) Patent No.: US 7,192,386 B2
(45) Date of Patent: Mar. 20, 2007

(54) METHOD FOR CONTROLLING AND/OR REGULATING THE BRAKING TORQUE IN A DRIVE TRAIN, AND CONTROL AND REGULATING SYSTEM

(75) Inventor: Bernd Dietzel, Syrgenstein (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 177 days.

(21) Appl. No.: 10/490,350

(22) PCT Filed: Sep. 16, 2002

(86) PCT No.: PCT/EP02/10360

§ 371 (c)(1),
(2), (4) Date: Aug. 27, 2004

(87) PCT Pub. No.: WO03/029039

PCT Pub. Date: Apr. 10, 2003

(65) Prior Publication Data

US 2005/0020405 A1    Jan. 27, 2005

(30) Foreign Application Priority Data

Sep. 22, 2001  (DE) ............................... 101 46 742

(51) Int. Cl.
*B60W 10/02*    (2006.01)
(52) U.S. Cl. ........................................ 477/180; 477/110
(58) Field of Classification Search .................. 477/52, 477/53, 58, 59, 62, 67, 169, 180, 57, 168, 477/107, 109, 54, 65, 63, 110, 108, 174, 175, 477/118; 701/54, 104; 192/3.31, 58.3–58.4
See application file for complete search history.

(56) References Cited

U.S. PATENT DOCUMENTS

| 4,347,918 | A |   | 9/1982 | Bezencon et al. ...... 192/0.02 R |
|---|---|---|---|---|
| 4,957,194 | A | * | 9/1990 | Sawa et al. .................. 477/169 |
| 5,305,213 | A | * | 4/1994 | Boardman et al. ............. 701/54 |
| 5,749,060 | A |   | 5/1998 | Graf et al. ...................... 701/51 |
| 5,807,209 | A | * | 9/1998 | Matsubara et al. .......... 477/176 |
| 5,938,712 | A | * | 8/1999 | Ibamoto et al. ................ 701/54 |
| 6,066,069 | A |   | 5/2000 | Vorndran ....................... 477/38 |
| 6,152,275 | A | * | 11/2000 | Fischer et al. ............. 192/82 T |

(Continued)

FOREIGN PATENT DOCUMENTS

DE        43 34 210        4/1994

(Continued)

*Primary Examiner*—Charles A. Marmor
*Assistant Examiner*—Justin K. Holmes
(74) *Attorney, Agent, or Firm*—Baker & Daniels LLP

(57) ABSTRACT

The aim of the invention is to regulate the braking torque in a drive train comprising an internal combustion engine (2) and a gearbox unit (3) which can be coupled to the same, using a regulatable clutch (5). To this end, the power introduced by the wheels into the drive train of the vehicle is transmitted via the regulatable clutch (5), in the overrun condition. The torque which can be transferred via the regulatable hydrodynamic clutch is controlled or regulated in such a way that the drive motor connected to the gearbox unit is operated at a rotational speed $n_{m\text{-}soll}$ which is equal to or larger than the idling rotational speed $n_{Leerlauf}$.

24 Claims, 6 Drawing Sheets

U.S. PATENT DOCUMENTS

| | | |
|---|---|---|
| 6,236,929 B1 | 5/2001 | Sen et al. ................. 701/93 |
| 6,676,561 B2 | 1/2004 | Fritzer et al. .............. 477/70 |
| 2002/0110146 A1* | 8/2002 | Thayer et al. ............ 370/465 |
| 2003/0216848 A1* | 11/2003 | Katrak et al. ............. 701/54 |

FOREIGN PATENT DOCUMENTS

| | | |
|---|---|---|
| DE | 196 31 071 | 2/1998 |
| DE | 196 32 807 | 2/1998 |
| DE | 100 25 882 | 12/2000 |
| EP | 0 722 394 | 3/1998 |

\* cited by examiner

FIG_1

FIG_2

FIG_3

FIG_4

METHOD FOR CONTROLLING AND/OR REGULATING THE BRAKING TORQUE IN A DRIVE TRAIN, AND CONTROL AND REGULATING SYSTEM

CROSS-REFERENCE TO RELATED APPLICATION

This application is related to and claims the benefit under 35 U.S.C. §119 and 35 U.S.C. §365 of International Application No. PCT/EP2002/10360, filed Sep. 16, 2002.

BACKGROUND OF THE INVENTION

The invention relates to a method for controlling and/or regulating the drag torque in a drive train. More specifically, the invention relates to a control and/or regulating system that is assigned to a drive train for controlling and/or regulating the drag torque.

Methods for regulating the drag moment in drive trains of various designs are well known, and these especially include diesel-electric drive trains, but also conventional mechanical drive trains in various forms. In a conventional drive train with an internal-combustion engine and a mechanical drive train that comprises a gearbox unit connected to the engine, during the drag operation mode phase, a reversal of the energy flow occurs, i.e., power from the wheels is introduced into the vehicle, and serves the purpose of driving the drive train from the wheels to the internal-combustion engine. The document DE 43 34 210 A1 discloses a control system that can be used to operate an assembly for a vehicle, preferably a motor vehicle, in which at least a clutch is provided between an internal-combustion engine and a gearbox unit. In order to save fuel, by using a drive assembly of this kind in tandem with a control computer, during the drag operation mode phase, the drive engine is uncoupled from the gearbox unit and shut down. In order to end the drag operation mode phase, it is sufficient to actuate the foot throttle with a certain deflection angle and/or a certain speed of change in the deflection angle. In order to prevent a knowledgeable driver from knowingly interrupting the drag operation mode phase (and thus increasing the fuel consumption) by prematurely actuating the foot throttle, which would create an engine-braking effect for a short period, DE 43 34 210 A1 proposes to continuously measure the rotational speed of the gearbox's outgoing shaft and the position of the control lever during the drag operation mode phase and to assign the results to a reference value stored in computer memory. A subsequent comparison of this value, which characterizes the position of the foot throttle, makes it possible to re-engage the above-mentioned clutch during the drag operation mode phase only when the determined position of the foot throttle matches the actual position of the foot throttle. Thus, the fuel-saving effect is achieved by uncoupling the drive engine. However, it requires the actuation of at least one control element, and the drag operation mode itself cannot be influenced, especially in regards to the speed of the vehicle. When travelling downhill, this solution is especially disadvantageous, because it does not allow one to utilize the braking moment of the inertia of the internal-combustion engine. Therefore, this solution requires actuating additional braking equipment to avoid undesired acceleration. Furthermore, in this design, the internal-combustion engine is always uncoupled, irrespective of whether the engine braking moment can be utilized positively or negatively.

SUMMARY OF THE INVENTION

Therefore, the technical task of the present invention is to develop a method for controlling and/or regulating the drag moment in a drive train with an internal-combustion engine and a gearbox unit connected with the engine, comprising a regulatable clutch, whose drive and output sides can be connected, directly or indirectly through other power transmission elements, with the gear box input and output in the drag operation mode phase so that, irrespective of whether the engine-braking moment is large (in order to achieve a desirable prevention of an abrupt increase in the acceleration of the vehicle) or small, a fuel-saving driving mode is enabled. The solution, according to the invention, should also necessitate as small an expense on control technology as possible and should do so by using systems that are already available.

The features of the claims characterize the solution to the above-mentioned technical task according to the invention.

The method for controlling and/or regulating the drag torque in a drive train that comprises an internal-combustion engine and a gearbox unit which can be coupled to the same, and further comprising a regulatable clutch between the gearbox unit input and the gearbox unit output, whose drive side is connected, at least indirectly, with the gearbox unit input, and whose output side is connected, at least indirectly, with the gearbox unit output, is characterized in that, during a drag operation mode phase, the power introduced from the wheels into the drive train of the vehicle is transferred by the regulatable clutch. The moment transferred by the clutch is controlled or regulated in such a way that the drive engine connected to the gearbox unit is operated at a rotational speed $n_{M-Reference}$ which is equal to or greater than the idling rotational speed $n_{Idle-Run}$. This design has the advantage that the fuel supply of the engine is reduced or automatically and completely interrupted. The reduction or complete interruption of the fuel supply depends on whether the power introduced into the vehicle and theoretically available for the internal-combustion engine to drive the system in drag (push) operation mode or pull operation mode is, indeed, sufficient to operate the internal-combustion engine at idling rotational speed or at a higher rotational speed.

The solution provided by the present invention has the advantage of a substantial reduction in fuel consumption as compared with the conventional arrangement in a mechanical drive train with a permanent coupling. This advantage results from the fact that the vehicle is not delayed by an unnecessarily high drag torque of the internal-combustion engine due to the rotational speed resulting from the transmission of the gearbox. Thus, a vehicle riding uphill or on level terrain behaves similarly to how it does when idling. This method can be applied without any restrictions for rides over level terrain with little or no additional acceleration of the vehicle. In accordance with a further advantageous development of the method designed by this invention, this method can also be modified and applied to downhill rides by adjusting the appropriate control of the transferable moment of the clutch to ensure a ride with an almost constant speed $v_{constant}$, or at least to prevent the vehicle from accelerating greatly. The rotational speed of the internal-combustion engine is regulated in dependence on the desired travel speed, while taking into consideration the transmission unit arranged between the internal-combustion engine and the wheels and the connected transmission ratios. This solution allows one to keep a constant speed, in a simple manner, even during the drag operation mode phase and to adjust this speed to the concrete requirements, while optimally utilizing the available engine drag torque.

According to an especially advantageous embodiment of the invention, the method for controlling and/or regulating the drag torque is implemented in a drive train that comprises a drive engine and a gearbox unit, which can be coupled to the drive train, which further comprises a hydrodynamic clutch and a bypass clutch, which can be connected in parallel, and the bypass clutch serves the purpose of the mechanical coupling between the primary and secondary wheels of the hydrodynamic clutch. During the drag operation mode phase, the power introduced by the wheels into the vehicle, and especially into the drive train, is transferred by the hydrodynamic clutch. For this purpose, the bypass clutch is deactivated. Furthermore, according to the invention, the moment transmitted by the hydrodynamic clutch is controlled and regulated by changing the mass flow, and especially the filling ratio, in such a way that the drive engine connected to the input of the gear unit, and thus to the drive side of the hydrodynamic clutch, is operated at a rotational speed equal to or greater than the idling rotational speed, and thus the fuel supply to the internal-combustion engine is reduced or automatically and completely disconnected. Due to the hydrodynamic power transmission, the drag torque is controlled free of wear. The drive side of the hydrodynamic clutch is formed by the bucket wheel, which, during the transmission of the power from the drive engine to the gearbox unit output, functions as an impeller.

In this type of situation, should the moment transmitted by the hydrodynamic clutch be insufficient, the bypass clutch can be engaged and thus be operated as a bypass clutch regulated by slip control. In the drag operation mode, the drive power present at the wheels is then transmitted through two power branches, where the moment actually transmitted can be freely set (using the hydrodynamic clutch) by changing the filling ratio.

The method designed according to this invention can be applied to any type of non-continuously changeable gearbox units, gear-change units, automatic gear-change units or automatic transmissions.

In detail, the method designed according to the present invention works as follows:

During the ride, the presence of the drag operation mode is monitored and—if identified—this mode is recorded. In the simplest case, the drag operation mode is characterized by the non-actuation of the foot throttle and, furthermore, by a travel speed of >0 km/h. The indicated parameters, i.e., the values that, at least indirectly, describe the position of the foot throttle and the speed, are recorded. The nature of these parameters is such that, by using them, one can derive, for example, the speed, by means of mathematical or other direct relations.

In order to also identify the drag operation mode phase during a downhill ride, and with the foot throttle being simultaneously actuated, when the drag moment introduced by the wheels in the drive train is greater than the moment generated at the drive engine, for example, a parameter directly or indirectly characterizing the inclination of the vehicle can also be recorded, wherein the actuation of the foot throttle occurs in a range that allows one to identify a minute available drive moment at the internal-combustion engine, and thus is also monitored.

Furthermore, the rotational speed of the internal-combustion engine $n_{Engine-Actual}$ is being compared with the idling rotational speed $n_{Idle-Run}$. If the rotational speed is equal to or greater than the idling rotational speed, the engine control shuts off the fuel supply. If, due to the internal resistance of the drive train, the share of pull power theoretically available to the internal-combustion engine is less than the power required for achieving the idling rotational speed, the fuel supply is only reduced. The idling rotational speed or a minutely higher rotational speed can be reached within the scope of the overall control; however, the idling rotational speed $n_{Idle-Run}$, present at the internal-combustion engine, or a higher rotational speed, are entered into the system by means of regulating the correspondingly proportional rotational speed at the input of the gearbox unit. This type of regulation is especially of importance if a certain speed or a speed within a certain range is required, i.e., if it is required that the vehicle does not accelerate or accelerates only minutely, which is of extreme importance, for example, while riding downhill.

A parameter that at least indirectly characterizes the desired travel speed to be maintained is monitored and recorded. The desired travel speed can be the actual travel speed before the beginning of the drag operation mode phase, or the actual travel speed at the beginning of the drag operation mode phase, or a lower desired speed to be set by the driver. In accordance with this reference value for the travel speed, and thus with the rotational speed of the wheels, the internal-combustion engine rotational speed $n_{Engine-target}$ (which is equal to or greater than the idling rotational speed $n_{Idle-Run}$) is set, taking into consideration the transmission elements between the wheels and the internal-combustion engine.

This rotational speed can be set by means of the regulatable clutch, by regulating the moment to be transmitted through this clutch, and doing so by changing one of the defining parameters, for example the contact pressure in a frictional clutch, or the filling ratio in a hydrodynamic clutch.

In automatic gearbox units with a hydrodynamic clutch and a bypass clutch, after identifying the drag operation mode phase, there are two possibilities. The design of an automatic gearbox unit with a hydrodynamic clutch that can be completely emptied, does not require a separate clutch. In this case, one must determine, in a second step, whether the hydrodynamic clutch, and especially the toroidal working space between the primary and secondary wheels, is at least partially filled. If this is not the case, the filling process is initiated by actuating a device that influences the filling ratio. If the hydrodynamic clutch is filled (a minimum filling ratio must apply here), the bypass clutch is opened. The deactivation of the bypass clutch can occur a) simultaneously with the initiation of the filling process, or b) with a time delay, however, at the latest, it should occur upon the completion of the filling process or upon reaching a minimum filling ratio.

After the deactivation of the bypass clutch, the power transmission between the input of the gear unit and the subsequent stages or between the other mechanical torque-transformation devices with fixed transmission ratios will only occur through the hydrodynamic power branch. In automatic gearbox units with a transmission separation clutch, the hydrodynamic clutch can be continuously filled, which is why the second step of verifying the filling does not need to be performed in this type of clutch, and is thus optional. In order for the transmission of power to occur only through the hydrodynamic branch, the bypass clutch must be opened. Thus, in an automatic gear unit without a transmission separation clutch, the bypass clutch is opened in a third procedural step.

In the subsequent fourth procedural step, the actual rotational speed $n_{Engine-Actual}$ of the internal-combustion engine is compared with the idling rotational speed $n_{Idle-Run}$, as has been described above. If the rotational speed is equal to or greater than the idling rotational speed, the engine control shuts off the fuel supply. If the pull power share theoretically available to the internal-combustion engine (due to the internal resistance of the drive train) is less than the power required for achieving the idling rotational speed, the fuel supply is only reduced. The idling rotational speed or a minutely higher rotational speed can be set within the scope of the overall control; however, the idling rotational speed $n_{Idle-Run}$ present in the internal-combustion engine or a higher rotational speed should be entered into the system by means of regulating the correspondingly proportional rotational speed at the input of the gearbox unit. This type of regulation is especially of importance if a certain speed or a speed within a certain range is required, i.e., it is required that the vehicle does not accelerate or accelerates only minutely, which is of extreme importance when riding downhill. This rotational speed can be set by means of the regulatable clutch, by regulating the moment to be transmitted through this clutch, and doing so by changing the filling ratio.

The method designed according to this invention is suitable for application in drive trains with gear units of any type—manual gearboxes or preferably automatic gear units and automatic transmissions—that comprise a regulatable clutch, for example, a hydrodynamic clutch.

As for the equipment, the implementation of the control and regulation functions requires a control and regulation system specifically assigned to the drive train. This system comprises a control device, preferably a control unit specifically assigned to the gearbox unit, and an engine control unit specifically assigned to the internal-combustion engine. The two control units can also be integrated in one single device, and the function can be taken over by a drive control device. The term "control device" is understood to include a control unit, monitoring and recording equipment and regulating equipment as well as the required links—wireless, electronic, etc.—between them. The control device of the gearbox unit comprises:

- at least one input for serial data transmission, or a number of parallel inputs that are connected to a monitoring and recording device, which records a parameter at least indirectly characterizing the actual rotational speed of the internal-combustion engine ($n_{Engine-Actual}$);
- (if the regulatable clutch is designed as a hydrodynamic clutch with an assigned bypass clutch) a device for monitoring and recording a parameter at least indirectly characterizing the actuation of the bypass clutch;
- a device for monitoring and recording a parameter at least indirectly characterizing the filling of the hydrodynamic component, especially a hydrodynamic clutch, and
- a device for monitoring and recording a parameter at least indirectly characterizing the presence of the drag operation mode.

This data can also be provided through a communication network, for example, a CAN bus, if available. The control unit, preferably the control unit of the gearbox unit, processes this data and, following the procedural steps, generates the regulation parameters required to regulate individual elements of the gearbox unit, especially to deactivate the bypass clutch and to fill, or more accurately, to influence the filling ratio of the hydrodynamic clutch, and to regulate the regulatable clutch. The reduction of the fuel supply occurs automatically, according to the rotational speed of the drive engine, by means of a control device assigned to the internal-combustion engine. As for the concrete design of the control device, there are a number of options to perform the algorithm described in the figures. The individual evaluation devices can be formed by separate elements, or they can be integrated in one single evaluation device.

BRIEF DESCRIPTION OF THE DRAWINGS

The solution designed according to the invention will now be explained in detail using the attached figures. The content of the figures is as follows.

DETAILED DESCRIPTION

Figure 1:
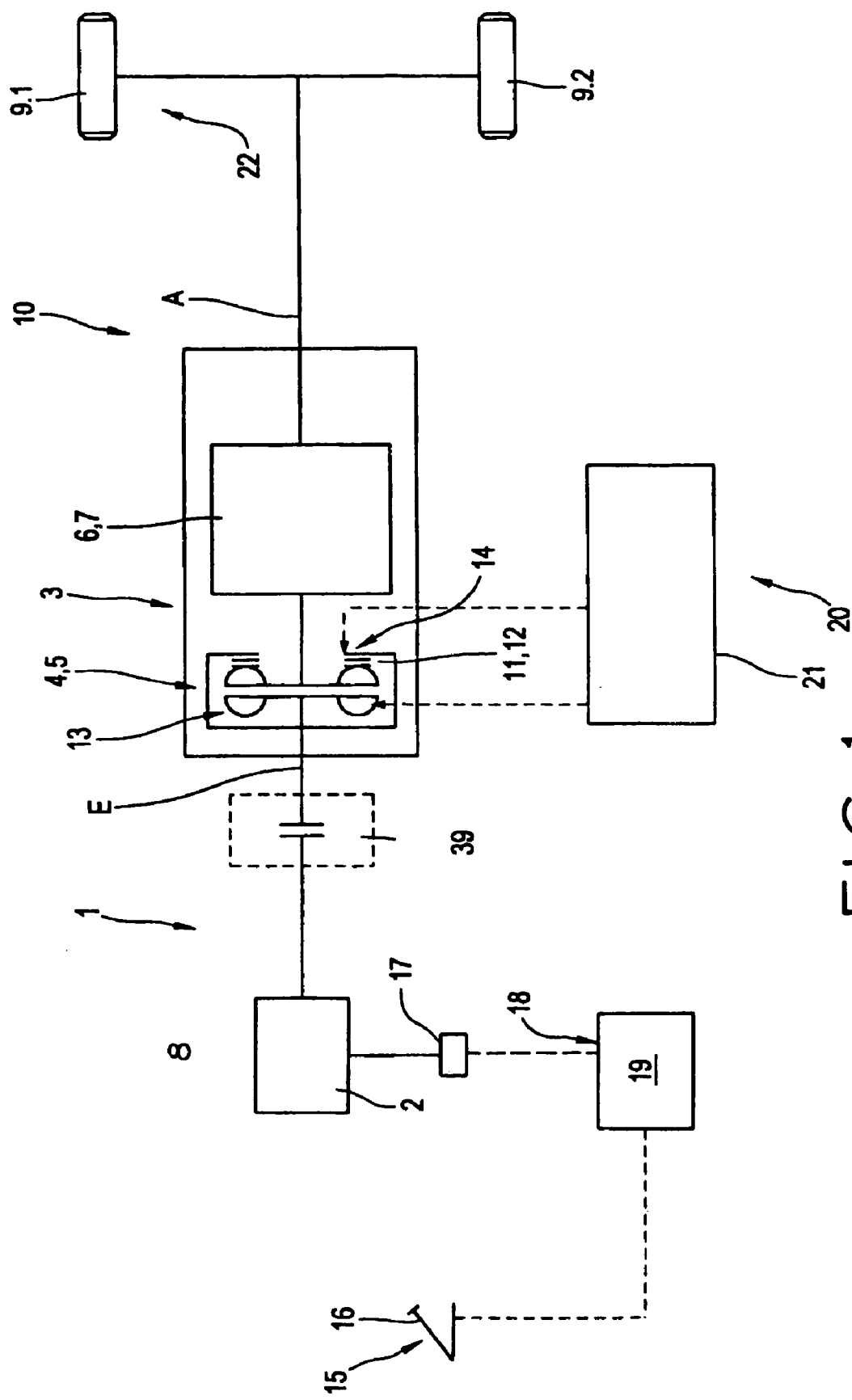
FIG. 1 illustrates, in schematically simplified representation, a drive system—in which the method according to the invention is implemented—with an automatic gearbox comprising a hydrodynamic clutch as a regulatable clutch.
Figure 5:
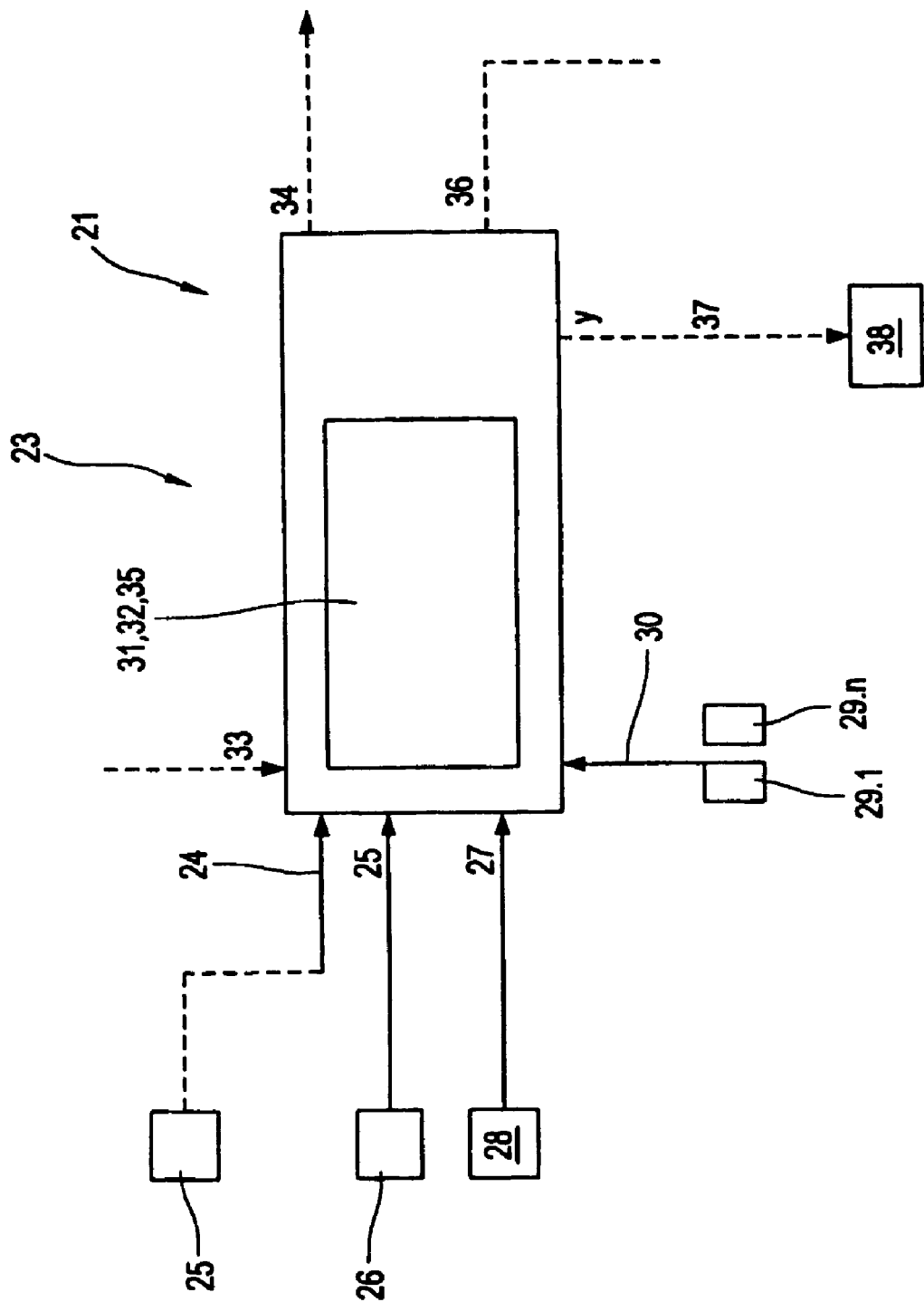
FIG. 5 illustrates, in schematically simplified representation, the basic design of a control and regulation system for a drive system implementing The invented method.

FIG. 1 illustrates, in schematically simplified representation, a drive system 1, in which the method according to the invention is implemented in a particularly advantageous manner. The system comprises an internal-combustion engine 2, and a gearbox unit 3 that can be mechanically connected to it. The gearbox unit is designed as an automatic gearbox. In this type of gearbox, the power between the gearbox unit and the drive engine can be completely interrupted during the gear-changing process. The gearbox unit 3 comprises an initiating element 4 in the form of a regulatable clutch 26 (FIG. 5)—here a hydrodynamic clutch—and a gear component 6, which is coupled to this starting element 4, and which can have the form of subsequently arranged stages. The drive end of the initiating element 4—marked here with 8—is connected with the gearbox input E—seen in the force flow direction in traction operation from the internal-combustion engine towards the drive. The output of the subsequent stages usually forms the output A of the entire gearbox unit. This output is connected—through additional transmission means, for example, in the form of a shaft assembly and/or torque-converting devices—with the driven wheels 9.1, 9.2 of a vehicle 10. The gearbox unit 3 further comprises an engageable and disengageable clutch 11 as a bypass clutch 12, which can be engaged parallel to the hydrodynamic clutch 5. The power transmission occurs either in a first power branch 13, when the power is transmitted through the hydrodynamic clutch 5, or in a second power branch 14, when the power is transmitted through an engaged bypass clutch 12. As the system is designed, a complete interruption of the force flow between the internal-combustion engine and the gearbox unit 3 during the gear changing requires either a separating clutch or a complete emptying of the hydrodynamic clutch 5, especially if the bypass clutch 12 is deactivated. If a separating clutch is provided, it can either be integrated in the gearbox unit 3 or, alternatively, be arranged between the internal-combustion engine 2 and the gearbox unit 3 as marked with a broken line and the reference number 39 in FIG. 1.

Figure 2:
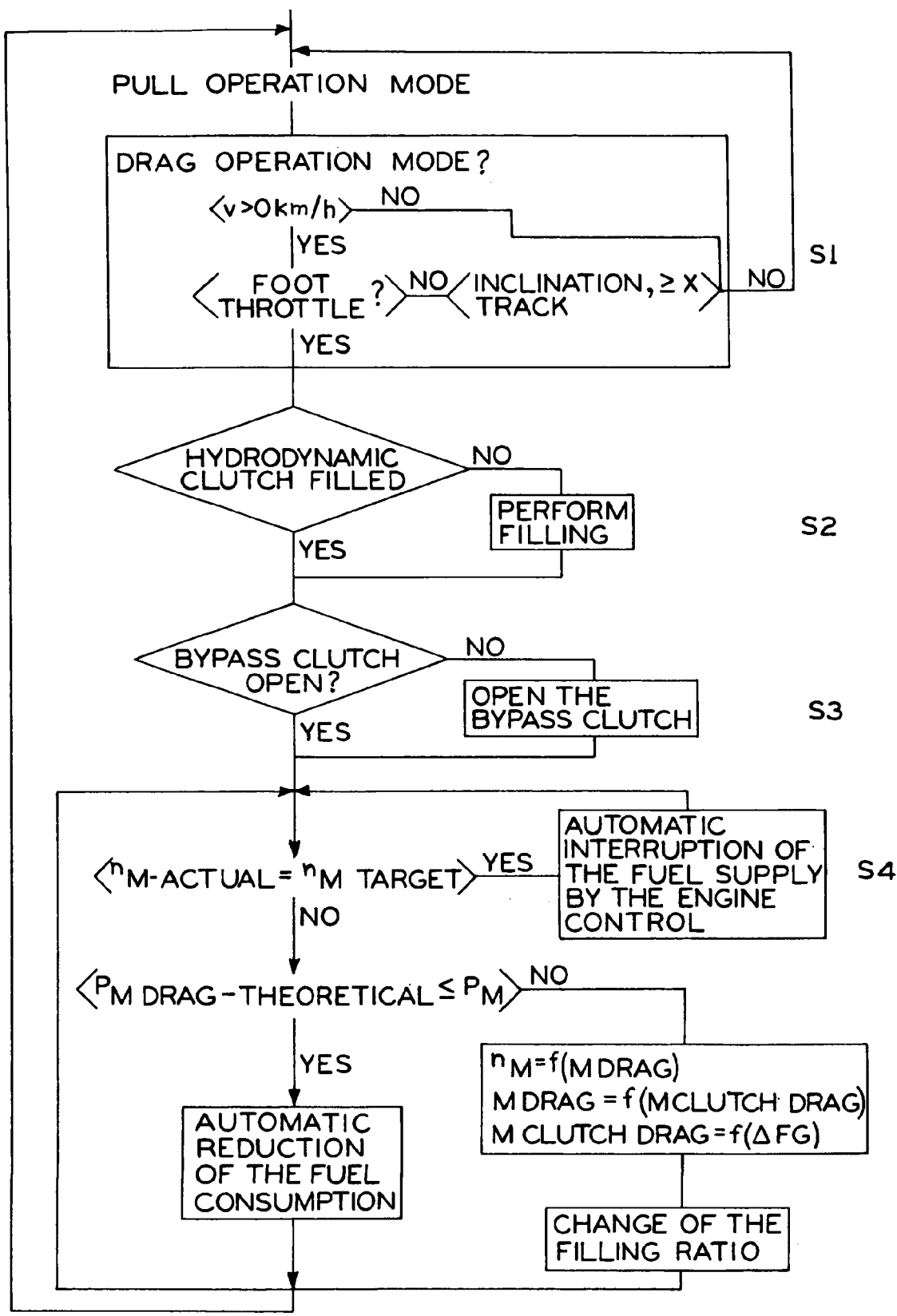
FIG. 2 illustrates, using a signal flow diagram, the underlying idea of the invented method when used in a drive system as shown in FIG. 1.

The driving power is provided by the internal-combustion engine 2. The power supply is controlled by an operation element 15, designed, for example, as a foot throttle 16, which is connected with a regulator 17 in the form of a power regulator of the internal-combustion engine 2. Preferably, the connection should occur through a so-called engine-control device 18, which comprises control equipment 19 in the form of a motor control unit and which converts at least one signal—for the driver's wish to accelerate or decelerate—into at least one corresponding regulation signal for the regulator 17. Furthermore, a control device 20 is provided, preferably in the form of a gearbox control unit, which comprises a control contrivance 21 in the form of a gearbox control unit, and which serves the purpose—besides controlling individual regulators that operate the regulating elements in the gearbox unit 3 representing individual gears—of controlling the power transmission through the hydrodynamic clutch 5, especially during the drag operation mode. While the traction operation occurs in the form of power transmission between the internal-combustion engine 2 and the output 22 in the form of the driven wheels 9.1 and 9.2, the drag operation mode is characterized by a reversal of the energy flow direction. Upon release of the foot throttle 16 and/or during a downhill ride, the wheels 9.1 and 9.2 will drive the internal-combustion engine 2. In accordance with the invention, during the drag operation mode, the power is transmitted by the hydrodynamic clutch 5, which means that the bypass clutch 12 is opened, i.e., deactivated, and the hydrodynamic clutch 5 is controlled or regulated—with regard to its torque transmission behavior—by changing its filling ratio in such a way that a torque of at least $M_{Engine-Drag}$ is introduced from the output, i.e. the wheels 9.1 and 9.2, into the internal-combustion engine 2, so that the engine is operated at a rotational speed $n_1$, which is greater than or equal to the idling rotational speed $n_{Idle-Run}$. Furthermore, upon reaching the rotational speed $n_1$, the engine control device assigned to the internal-combustion engine 2 reduces or shuts off the fuel supply. FIG. 2 illustrates this procedure in the form of a flow diagram. During a normal operation, immediately after starting up the vehicle 10, in a first procedural step S1, any presence of a drag operation mode, or rather a parameter directly or indirectly characterizing the presence of the drag operation mode, is constantly monitored and recorded for the entire duration of the vehicle's operation. If the vehicle 10 is detected to be in drag operation mode, which in the simplest case is characterized by the non-actuation or release of the foot throttle 16 and a speed v>0 km/h, the system will check whether the hydrodynamic clutch 5 is filled (as shown in the signal flow diagram in FIG. 2). If it is not filled, the filling process is initiated. When the hydrodynamic clutch 5 is at least partly filled, the bypass clutch 12 is released, i.e., deactivated. The procedural step of checking the filling of the hydrodynamic clutch 5 is required only for automatic gearboxes, which do not have a separating clutch and which realize the complete interruption of the force flow during the gear-changing process by emptying the hydrodynamic clutch 5. This step can be left out if the complete interruption of the force flow between the internal-combustion engine 2 and the gearbox unit 3 is realized by means of a separating clutch. In this process, during a drag operation mode, the bypass clutch 12 is deactivated. With this type of gearbox, this occurs in the procedural step S2, and in a third step in automatic gearboxes that have no separating clutch and thus the possibility of completely interrupting the power flow by emptying the hydrodynamic clutch, as shown in FIG. 2. During this third step S3, the system can also verify whether the bypass clutch is activated and, if so, deactivate it. At the latest, the power transmission occurs upon a complete deactivation of the bypass clutch 12 through a first power branch 13, i.e., through the hydrodynamic clutch 5 and— seen from the internal-combustion engine to the wheels— from the actual output side 22 to the drive side 8. Moreover, depending on the available drag power, the fuel supply is interrupted or at least reduced in the next procedural step S4. In order to ensure a smooth operation of the drive system 1, the internal-combustion engine 2 must be operated at the idling rotational speed $n_{Idle-Run}$ or greater. The engine will use the power transmitted through the hydrodynamic clutch 5, and will require enough power to allow the drive engine to operate, i.e., the internal-combustion engine 2 at the idling rotational speed $n_{Idle-Run}$, which will mean that the inherent internal resistance has been overcome. Depending on the available power introduced by the wheels 9.1 and 9.2 to overcome the resistance in the drive system, which is designated as $P_{Drag}$, the torque $M_{Clutch-Drag}$ transmitted by the hydrodynamic clutch is influenced by regulating the hydrodynamic clutch, especially its filling ratio, in such a way that enough torque $M_{Clutch-Drag}$ is introduced into the internal-combustion engine 2 so that the internal-combustion engine can operate at an idling rotational speed $n_{Idle-Run}$ or at a higher speed $n_{Engine-Drag}$. The rotational speed $n_{Engine-Drag}$ of the internal-combustion engine 2 equals either the rotational speed at the input E of the gearbox unit 3, and thus equals the rotational speed of the drive side 8 of the hydrodynamic clutch 5 during the drag operation mode, which serves as the output side, or is at least proportional to this rotational speed; however, we must always take into consideration any internal friction loss or additional interconnected transmission elements. The power $P_{rec}$ available from the hydrodynamic clutch 5 equals the drag power $P_{drag}$ introduced by the wheels 9.1 and 9.2 minus the power $P_{D-drag}$ required to drive the remaining drive train between the clutch 5 and the wheels 9.1 and 9.2. The influencing of the transmittable torque (and due to the equality of torques between the output side and the drive side 8 of the hydrodynamic clutch 5 with the same power present $P_{clutch}=P_{drag}-P_{D-Drag}$) a conversion of the rotational speed occurs, allowing one to set a rotational speed $n_{Actual}^{Engine-Drag^3} n_{Idle-Run}$ using the interdependence of the transmission devices between the internal-combustion engine 2 and the gear unit 3. Thus, the target rotational speed $n_{Engine-Target}$ of the internal-combustion engine 2 is equal to or greater than the idling rotational speed $n_{Idle-Run}$, and is thus a function of the torque $M_{Clutch-Drag}$ transmittable by the clutch. So, the target rotational speed $n_{Engine-Target}$ can either only be set by the regulation system or further regulated, in which case (as shown in the signal flow diagram in FIG. 2) the target rotational speed $n_{Engine-Target}$ of the internal-combustion engine 2 is continuously compared with the actual set rotational speed $n_{Engine-Actual}$. The reduction or complete disconnection of the fuel supply depends on whether the power $P_{Engine-Drag-Theoretical}$ introduced into the vehicle and theoretically available to the internal-combustion engine in the pull or drag operation modes is really sufficient to operate the internal-combustion engine at the idling rotational speed $n_{Idle-Run}$ or at a higher rotational speed. The fuel supply is automatically reduced or completely disconnected by the engine control device upon reaching the desired rotational speed.

In this design, the procedure shown in FIG. 2 applies to ride situations in the pull operation mode that are characterized by a ride speed of >0 km/h and the non-actuation of the foot throttle 16, when the acceleration can be negative or positive. However, the drag operation mode also occurs during a downhill ride, which is not necessarily characterized by the non-actuation of the foot throttle 16. In other words, this drag operation mode occurs when the power $P_{Drag}$ introduced into the vehicle is greater than the power $P_{E-Actual}$ set by the power regulator of the internal-combustion engine 2 as the power to be achieved. This is especially the case with steep downhill slopes. As for the presence of the drag operation mode, various parameters can be applied. One of the safe parameters is the actuation of the foot throttle. However, for the case of a downhill ride where the foot throttle 16 is still being actuated, there must be one more parameter characterizing the drag operation mode to be monitored and recorded, for example, the drag torque introduced by the wheels. In this case, the vehicle is in the drag operation mode if the introduced torque is greater than the torque generated by the drive engine. In such a situation, especially when the foot throttle is still being actuated, the torque introduced by the wheels 9.1 and 9.2 would be equidirectional with the torque generated by the internal-combustion engine 2, and would have to be added. The procedural step of verifying whether the hydrodynamic clutch 5 is filled or not, is relevant only for automatic gearboxes without a special separating clutch. In automatic gearboxes with a separating clutch, the hydrodynamic clutch 5 can always be filled, which is why this procedural step can be left out. However, in accordance with an advantageous embodiment of the invention, this step is still included for safety reasons.

The rotational speed of the drive engine in the form of the internal-combustion engine 2 can be set or, in an advantageous embodiment of the invention, further regulated. Thus, as shown in the signal flow diagram in FIG. 2, in a fifth procedural step, the actual rotational speed of the engine $n_{E-Actual}$ is compared with the idling rotational speed $n_{Idling}$ or another, higher rotational speed, which is also designated as $n_{E-Target}$. If the rotational speed $n_{E-Actual}$ of the internal-combustion engine is lower than the idling rotational speed $n_{Idling}$ or another higher rotational speed $n_{E-Target}$, the hydrodynamic clutch 5 is regulated—with regard to its torque transmission capacity—so that a rotational speed is set (by changing the filling ratio $\Delta$FG) on the drive side 8, which is now acting as the output side, that is equal or proportional to the idling rotational speed $n_{Idling}$ or another higher rotational speed $n_{E-Target}$. This higher rotational speed $n_{E-Target}$ can be permanently pre-set, or can be freely regulated within a range depending on the size of the available drag power.

As for the possibility of regulating the torque transmitted by the hydrodynamic clutch 5, there are several options; the preferred one is a simple pressure regulation. This regulation occurs when an external circuit assigned to the hydrodynamic clutch closes. This circuit connects an inlet with an outlet of the working space by generating and/or exerting pressure on a medium. During the operation of the hydrodynamic clutch 5, a portion of the medium present in the working space is conducted, through a closed circuit, between at least one outlet from the toroidal working space between the impeller and the turbine wheel, and at least one inlet to the toroidal working space, while the inlet is connected with a medium storage container, which is pressure sealed from the ambient area. A parameter characterizing the pressure to be exerted on the medium present in the medium storage container is generated, and the regulator is actuated. The filling or emptying of the hydrodynamic clutch continues until a pressure equilibrium is reached between the medium in the medium storage container and the medium rotating in the closed circuit. Another option, which works especially well for hydrodynamic clutches without such closed systems, consists in regulating the filling ratio by controlling the hydrodynamic clutch's inlet and/or outlet pressures. However, the concrete selection of the possibility to change the filling ratio depends on the concrete design and the available supply systems. A concrete selection and adaptation should be done at the discretion of the expert.

With regard to the equipment, the drive system 1 is assigned a control and/or regulation system 23 (FIG. 5), which comprises a control device 18 assigned to the internal-combustion engine and a control device 20 assigned to the gear unit. The control device comprises a control unit 19 in the form of an engine control device, and serves the purpose of controlling a power regulator in the form of a regulating device 17 designed to control the fuel supply. The control device 20 in the form of a gearbox control contrivance comprises a gearbox control unit 21, which—besides controlling individual regulators that actuate individual regulating elements of the gear unit 3—also serves to control the power transmission in the hydrodynamic clutch 5. The term "control device" always includes monitoring and recording equipment and regulating equipment, as well as the links between the output(s) of the monitoring and recording equipment and the regulating equipment. A control device usually includes a control unit in the form of a microcomputer with a corresponding memory capacity, or a combination of a microcomputer with additional function components. The control device processes a number of incoming signals and converts them into a set of regulation signals. The control device 21 comprises—depending on whether it uses serial or parallel data transmission—at least one input 24 (FIG. 5), which is linked to a device 25 that monitors and records at least one parameter characterizing, at least indirectly, the presence or absence of a drag operation mode. Furthermore, the control device 21 is fed a signal that contains at least one parameter characterizing, at least indirectly, the actual filling ratio, which can occur through the same input 24, or through an additional input 25. For this purpose, this input is linked to a device that monitors and records the filling situation in the hydrodynamic clutch. This device is designated with the reference number 26. The rotational speed $n_{E-Actual}$ of the drive engine 2 is usually recorded by the data acquisition device 28, which is assigned to the internal-combustion engine 2, and which can be connected to the control device 21 either directly through a direct link with an output 27, or indirectly, through a data communication network, for example, a CAN bus. Depending on whether a reduction of the fuel consumption by reducing the fuel supply or a complete disconnection of the fuel supply is desired, it is useful to also determine the amount of theoretically available drag power $P_{Engine-Drag-Theoretical}$, or at least a parameter characterizing, at least indirectly, this amount. This process requires the corresponding data recording equipment 29.1 to 29.n that determines or computes the power introduced by the wheels into the vehicle during the drag operation mode phase, and makes it possible to determine the drag power theoretically available to the engine. These parameters are fed into the system through an input 30. If serial data transmission is used, the control device 21 has only one input. Within the control unit 21, an evaluation unit 31 checks whether the vehicle finds itself in the drag operation mode or not. If the drag operation mode is positively determined, then—depending on the gearbox system (with or without a separating clutch)—the filling ratio is checked, i.e., the signal incoming at the input 25 is evaluated. This can occur in the same evaluation unit 31, or in another evaluation unit 32. Depending on the filling ratio of the hydrodynamic clutch 5, the activation of the bypass clutch is then checked. For this purpose, a signal incoming at the input 32 (which characterizes the actuation or non-actuation of the bypass clutch) is evaluated. If the bypass clutch is activated, a regulating signal to deactivate it is sent from an output 32. However, the activation of the bypass clutch does not need to be specially checked, and a separate signal does not need to be retrieved through the input 31. It can be derived from the current gear status, which must be stored in the control device 21. Furthermore, the control device comprises an additional evaluation unit 35, which can be contained in one construction unit together with the evaluation units 31 and 32, or its function can be assumed by one single evaluation unit. This evaluation device compares the current rotational speed of the engine $n_{engine-actual}$ with the idling rotational speed. As an option, if this rotational speed is exceeded, the system compares the drag power theoretically available to the internal-combustion engine $P_{Engine-drag-theoretical}$ with the idling rotational speed $P_{drag-idle-run}$. Should the power introduced by the wheels into the vehicle be less than the power required for idle run, the engine control device only reduces the fuel supply and regulates the internal-combustion engine in such a way that the remaining power required for the idle run is generated by the engine, i.e., the torque generated by the engine $M_{engine-generated}$ and the drag torque introduced into the internal-combustion engine $M_{drag}$ are added together. On the other hand, when the power introduced by the wheels into the vehicle is greater than the power required for an idle run, the fuel supply can be completely shut off. In both cases, a power regulator 17 of the internal-combustion engine is actuated by the engine power control unit through an output 36, which is connected either directly to the power regulator 17 or to the control device 19 of the control device of the internal-combustion engine. This link can be mechanical or wireless. However, in both cases, the torque transmitted by the hydrodynamic clutch $M_{drag-clutch}$ is regulated in such a way that the rotational speed at the drive side 8 in the traction operation mode, and at the input E acting as the output side side in the drag operation mode, is equal to or greater than the idling rotational speed of the internal-combustion engine 2 $n_{idling}$, or is proportional to the rotational speed of the internal-combustion engine 2 so that the rotational speed of the internal-combustion engine 2 is always equal to or greater than the idling rotational speed, while taking into consideration all interconnected transmission elements. For this purpose, a regulating parameter Y is released at the output 37 in order to change the filling ratio, for example, by means of pressure, or by changing the position of a valve. The output 37 is linked to a device that influences the filling ratio 38.

Figure 3:
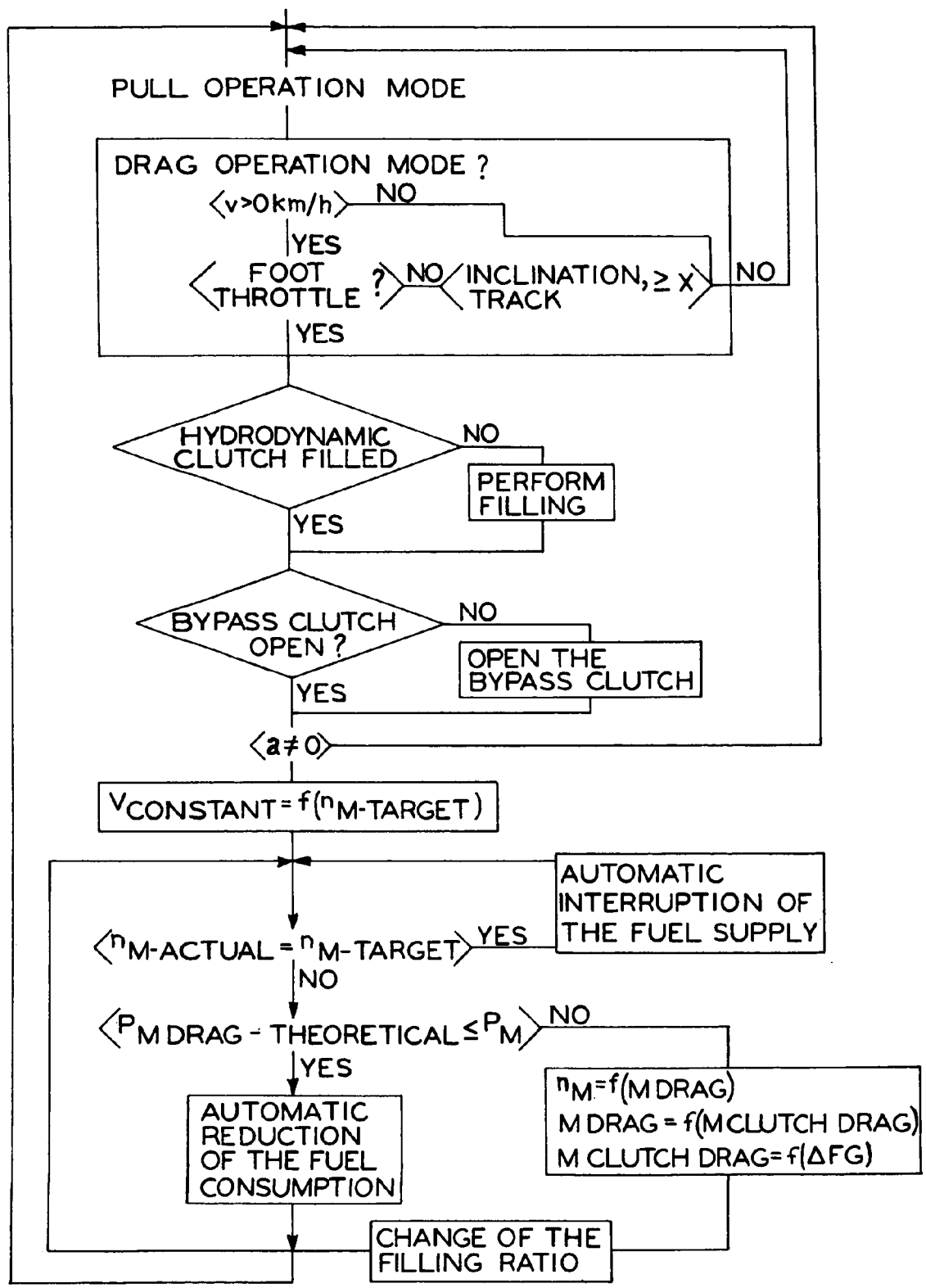
FIG. 3 illustrates, using a signal flow diagram, the underlying idea of the regulation of the rotational speed during a downhill ride for a drive system designed as shown in FIG. 1.

The solution designed according to the invention serves the purpose of reducing the fuel consumption during the drag operation mode by regulating the drag torque in the drive train with a gearbox in such a way that the drive engine is operated at a minimum idling rotational speed. The concrete implementation and equipment is not limited to the design as shown in FIG. 3. Other modifications are possible. For example, the individual devices could be integrated in a single control device, or the function of this control device could be assumed by the drive control or another control device. As for the link between the individual data acquisition equipment and the control devices, there are also a number of options available. The individual parameters could be available to each of the control devices in a network, for example, in a CAN bus. Other options, for example, a direct mechanical link, are also conceivable. These design choices depend on the concrete conditions of the invention's expected use.

Figure 4:
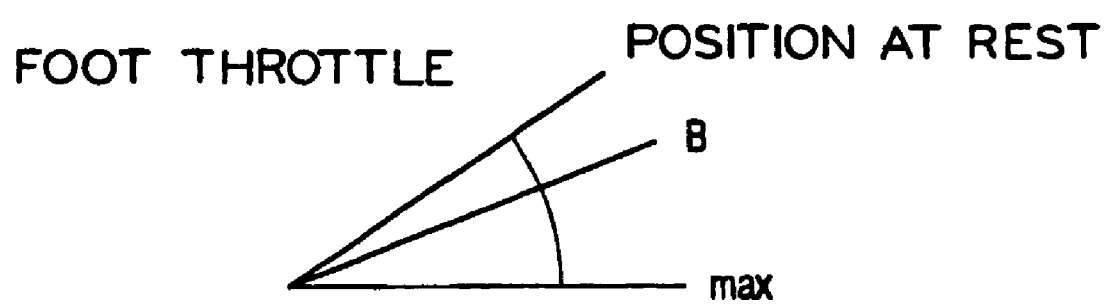
FIG. 4 illustrates the setting of reference positions of the foot throttle.

FIG. 4 illustrates a possible range division of the foot throttle. In order to avoid too abrupt a transition between the drag operation mode (with a drag torque between 0% and 100%) and the status of riding with a positive drive torque (the foot throttle sets a positive torque, i.e., allows fuel supply to the internal-combustion engine), the function of the foot throttle must be extended. The schematically simplified representation shows three positions. Position B represents a zero drag torque and, simultaneously, an engine torque set to zero. The position at rest represents the maximum possible drag torque present with the engine rotational speed $n_{Engine-Actual}{}^3 N_{Idle-Run}$, and the position "Max" represents the maximum settable engine torque. This allows one to achieve a continuous, smooth transition from the maximum drag torque with a closed bypass clutch to the minimum drag torque arising when the invented procedure is applied at a maximum reduced rotational speed of the engine, to drag torque=0/engine torque=0 in the position B and to maximum engine torque in the position "Max." Upon the shift from the drag operation mode into an operation with a positive engine torque, i.e., upon changing the foot throttle position from the range between its rest position and B into the range between B and "Max," the bypass clutch is closed again. This can occur in dependence on the rotational speed of the engine.

In another aspect of the invention, the drag torque transmitted by the hydrodynamic clutch is controlled, or rather regulated, in such a way that the vehicle does not achieve any positive acceleration $a_{ppositive}$. For this purpose, a parameter at least indirectly characterizing the acceleration 'a' is continuously determined and, in dependence on the desired riding speed to be maintained, the rotational speed in the drive train—and thus the rotational speed of the wheels to be driven—while taking into consideration the necessity to operate the internal-combustion engine 2 at a minimum idling rotational speed $n_{idling}$—is influenced in such a way that the riding speed defined by means of the rotational speed of the wheels does not exceed a preset limit. This speed can be the current riding speed, or the actual riding speed at the moment, when the drag operation mode started, or another speed defined by the driver, which, however, should lie within the range between the two aforementioned speeds. For this purpose, a rotational speed $n_{engine-target}$ for the internal-combustion engine 2 is derived from the desired target riding velocity $v_{target}$, while taking into consideration the transmission elements arranged between the wheels and the internal-combustion engine 2. This rotational speed is proportional to the rotational speed of the wheels, which allows one to achieve a constant riding velocity $v_{constant}$. The changing of the filling ratio FR of the hydrodynamic clutch 5 occurs so that, depending on the available power, enough torque M is transmitted to cause a rotational speed of $n_{Engine-actual}=n_{Engine-target}$. In this case, setting the rotational speed of the internal-combustion engine 2 to a rotational speed $n_{Engine-target}$ equal to or greater than the idling rotational speed $n_{idle-run}$ is integrated into maintaining a constant riding velocity $v_{constant}$.

Figure 6:
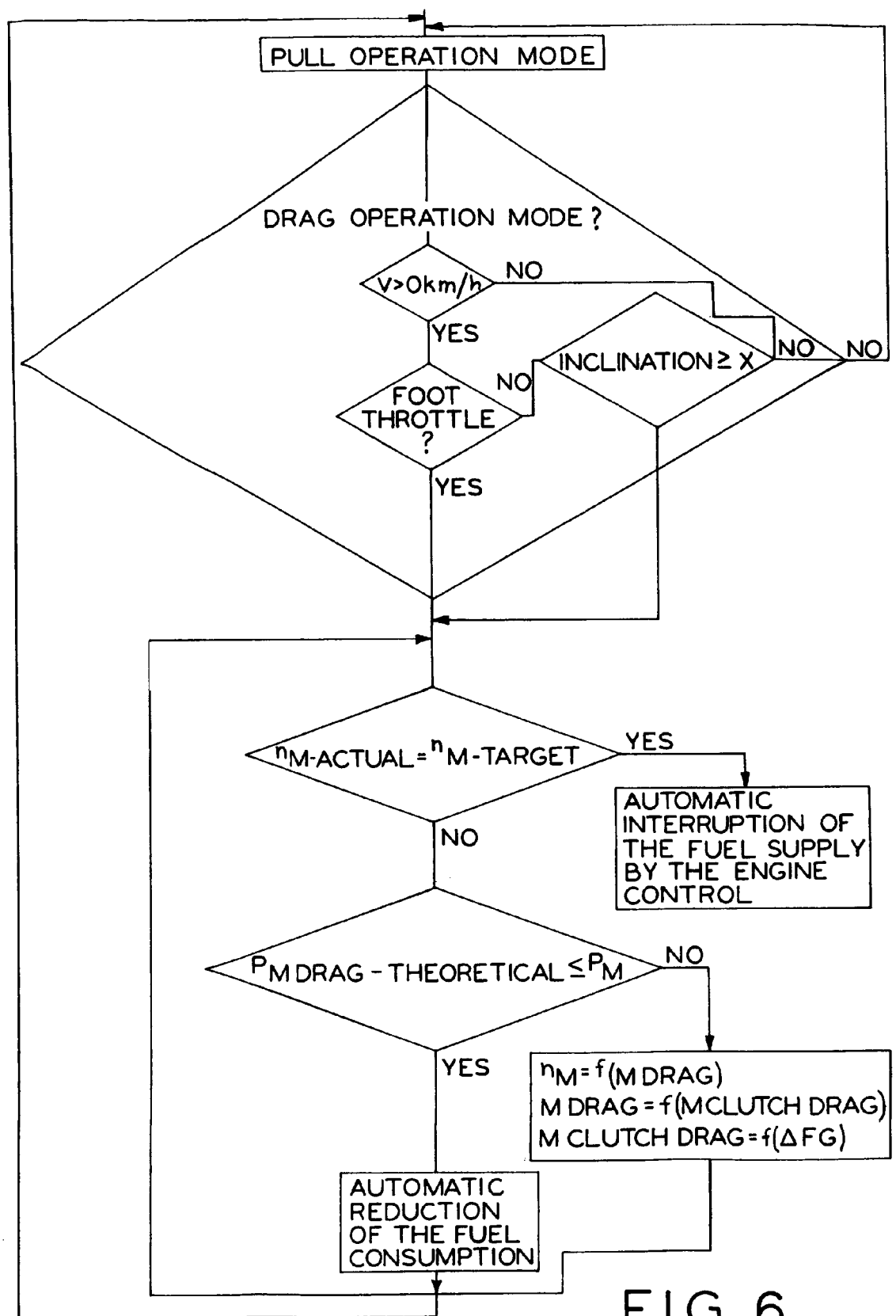
FIG. 6 illustrates, using a signal flow diagram, the general underlying idea of the invented method.

FIG. 6 illustrates, using a signal flow diagram, the underlying idea of the invented method for a gearbox unit with a regulatable clutch 26 between a gearbox input E and a gearbox output A, wherein the drive side of the regulatable clutch 26 is connected, at least in a transmitted way, i.e., directly or indirectly, by additional transmission elements, with the gearbox input, and the output side is connected with the gearbox output A, directly or indirectly, by additional transmission elements. Here, too, during the riding operation the presence of the drag operation mode is being verified. The drag operation mode is characterized by a riding operation with a velocity V>0 km/h and the non-actuation of the foot throttle. The acceleration of the vehicle can be positive or negative. After the drag operation mode is detected, the rotational speed of the drive engine is determined and is then compared with a desired rotational speed $n_{Engine-Target}$, which is only minutely greater than the idling rotational speed. If the idling rotational speed or the desired rotational speed $n_{Engine-Target}$ has already been reached, the engine control automatically shuts off the fuel supply. This occurs in a third step that follows the second step. Otherwise, the theoretical drag torque introduced by the wheels into the engine through the drive train is compared with the actual power $P_M$ generated by the drive engine. If the theoretically available drag power is sufficient to operate the internal-combustion engine at the idling rotational speed, the regulatable clutch lets through only enough drag torque $M_{drag}$ to the internal-combustion engine as is necessary to reach the idling rotational speed $n_{engine-idle-run}$. Depending on the design of the regulatable clutch, this means a change in the regulation parameter Y, which is sent to the regulator. In a hydrodynamic clutch, this is the filling ratio $\Delta FR$, whereas, for example, in a friction clutch, the regulation parameter represents the force $F_A$ applied to the clutch's friction elements. This occurs until the idling rotational speed $n_{engine-idle-run}$, is reached, or until the desired target speed $n_{Engine-Target}$ equals the idling rotational speed or a minutely higher rotational speed.

LIST OF REFERENCE NUMBERS

1 Drive system
2 Internal-combustion engine
3 Gearbox unit
4 Starting element
5 Hydrodynamic clutch
6 Gearbox part
7 Subsequent stage
8 Drive side
9.1, 9.2 Wheels
10 Vehicle
11 Regulatable Clutch
12 Bypass clutch
13 First power branch
14 Second power branch
15 Operation element
16 Foot throttle
17 Regulator
18 Control contrivance
19 Control device
20 Control contrivance
21 Control device
22 Drive side
23 Control and/or regulation system
24 Input
25 Device for detecting at least one parameter at least indirectly characterizing the drag operation mode
25 Input
26 Regulatable clutch
26 Device for detecting the filling ratio, i.e., the filling status of the hydrodynamic clutch
27 Input
28 Device for detecting the rotational speed of the internal-combustion engine
29.1, 29.n Devices for detecting the parameters for the description of the drag power $P_{engine-drag}$ theoretically available to the internal-combustion engine
30 Input
31 Evaluation unit
32 Evaluation unit
33 Input
34 Output
35 Evaluation device
36 Output
37 Output
38 Device for influencing the filling ratio of the hydrodynamic clutch
39 Separating clutch
E Gearbox clutch
A Gearbox output
$P_{drag}$ The power introduced into the vehicle by the wheels
$P_{rec}$ Power receivable by the hydrodynamic clutch
$M_{drag}$ Drag torque of the clutch
$M_{engine-drag}$ Drag torque introduced into the internal-combustion engine
$n_{clutch-drag}$ Rotational speed of the hydrodynamic clutch
$n_{Engine-actual}$ Actual rotational speed of the internal-combustion engine in the pull operation mode
$n_{Idling}$ Idling rotational speed
$n_{Engine-target}$ Target rotational speed of the internal-combustion engine in the pull operation mode

The invention claimed is:

1. A method for controlling and/or regulating drag torque in a drive train comprising an internal-combustion drive engine, and a gearbox unit having an input and and output, the gearbox unit coupled to the engine, and a regulatable clutch between the gearbox input and output, the drive train drive side coupled at least indirectly to the gearbox input and, as seen in the direction of power transmission during traction operation, the drive train output side coupled, at least indirectly, to the gearbox output; said method comprising:

during drag operation mode, transmitting by the regulatable clutch power introduced by wheels of the drive train into the drive train;

resulting torque transmitted by the regulatable clutch being controlled and regulated such that the engine coupled to the gearbox is operated at a rotational speed $n_{engine-target}$, that is equal to or greater than the engine idling speed $n_{idling}$;

the regulatable clutch being a hydrodynamic clutch with an assigned bypass clutch for a mechanical bypass between the drive side and output side of the hydrodynamic clutch, the hydrodynamic clutch and the bypass clutch being engageable in parallel operation; and controlling the torque transmitted by the hydrodynamic clutch by changing the filling ratio thereof.

2. The method according to claim 1 wherein, while moving downhill in the drag operation mode, the drive engine is operated at a rotational speed $n_{engine-target}$, which is greater than the idling rotational speed, wherein $n_{engine\text{-}target}$—while taking into consideration transmission elements in the drive train-causes a certain travel velocity $v_{target}$ of the vehicle.

3. The method according to claim 2, wherein the travel velocity $v_{target}$ is achieved by regulating the rotational speed of the drive engine.

4. The method according to claim 1, wherein the rotational speed $n_{engine\text{-}target}$ of the drive engine is regulated.

5. The method according to claim 1, wherein when drag power introduced into the vehicle and theoretically available to the internal-combustion engine is less than the power required to drag the internal-combustion engine with the idling rotational speed $n_{idling}$, the fuel supply is reduced.

6. The method according to claim 1, wherein the drag operation mode can be described by one of the following parameters:
    velocity v>0 km/h, and
    a foot throttle or any other operation element used by the driver is released.

7. The method according to claim 1, wherein the drag operation mode can be described by one of the following parameters:
    velocity v>0 km/h, and
    a parameter that describes, at least indirectly, the longitudinal inclination while moving downhill.

8. The method according to claim claim 1 wherein, in the drag operation mode, the bypass clutch is deactivated.

9. The method according to claim 1, wherein, if the drag torque is greater than the torque theoretically transmittable by the hydrodynamic clutch when fully filled, the bypass clutch is closed and is operated in the slip mode, wherein drag power introduced into the drive train is transmitted in a first power branch through the bypass clutch and in a second power branch through the hydrodynamic clutch.

10. The method according to claim 1 wherein:
    the hydrodynamic clutch can be completely emptied;
    in the drag operation mode the filling status of the hydrodynamic clutch is determined, and if it is not filled or is filled below a minimum filling level, the filling process is initiated;
    the bypass clutch is deactivated at a point between the time the presence of the drag operation mode is determined and the completion of the filling of the hydrodynamic clutch.

11. A control and regulation system for setting drag torque in a drive train, comprising:
    an internal combustion engine;
    a gearbox unit coupled to the engine and having an input and an output;
    a regulatable clutch in the form of a hydrodynamic clutch between the gearbox input and output, the drive train drive side coupled at least indirectly to the gearbox unit and, as seen in the direction of power transmission during traction operation, the drive train output side coupled, at least indirectly, to the gearbox output;
    means for controlling and regulating torque transmitted by the hydrodynamic clutch such that the engine is operated at a rotational speed $n_{engine\text{-}target}$ that is equal to or greater than the engine idling speed $n_{engine\text{-}idling}$; said means for controlling comprising a means for changing the filling ratio of said hydrodynamic clutch;
    a mechanical bypass clutch assigned to said hydrodynamic clutch to thereby provide a mechanical bypass between a drive side and an output side of the hydrodynamic clutch;
    said bypass clutch and said hydrodynamic clutch being engageable in parallel operation.

12. The control and regulation system according to claim 11, wherein the means for controlling is formed by a gearbox control unit.

13. The control and regulation system according to claim 11, comprising:
    an additional engine control device assigned to the internal-combustion engine comprising at least one input and one output;
    the control device input is linked to an output of the control device or to a device for detecting a parameter that least indirectly characterizes the current rotational speed of the internal-combustion engine;
    the output of the engine control device is linked to a regulator changing the fuel supply.

14. The control and regulation system according to claim 13, wherein the engine control device comprises a microcomputer, which—when the internal-combustion engine reaches the idling rotational speed $n_{idling}$, generates a regulation parameter for the regulator to shut off the fuel supply.

15. The control and regulation system according to claim 13, wherein the engine control device comprises a microcomputer which, upon the internal-combustion engine reaching the desired rotational speed $n_{engine\text{-}actual}=n_{engine\text{-}target}>n_{idling}$, generates a regulation parameter for the engine control device to change the fuel supply.

16. The control and regulation system according to claim 11, wherein a link between the means for controlling and data acquisition devices is wireless.

17. The control and regulation system according to claim 11, wherein the means for controlling and an engine control device are linked by a data communication network.

18. The control and regulation system according to claim 11, comprising:
    a device for the detection of a parameter at least indirectly characterizing the actuation of an operation element, the device being linked with an input of the means for controlling.

19. The control and regulation system according to claim 11, comprising:
    one or a number of devices for the detection of parameters that characterize the theoretical drag power $P_{engine\text{-}drag}$ available to the internal-combustion engine and that are connected with the input of the means for controlling.

20. The control and regulation system according to claim 11, comprising:
    inputs connected with a device for the detection of the filling status of the hydrodynamic clutch, and a device for the detection of a parameter at least indirectly characterizing the actuation status of the bypass clutch;
    an interface connected to the means for controlling and to a device for the deactivation of the bypass clutch.

21. A drive train, comprising
    an operation element actuated by the driver in order to change the riding status; and
    a control and regulation system according to claim 11.

22. The drive-train according to claim 11, wherein the gearbox unit is designed as a manual gear-changing box.

23. The drive-train according to claim 11, wherein the gearbox unit is designed as an automatic gear-changing box.

24. The drive-train according to claim 11, wherein the gearbox unit is designed as an automatic transmission.

* * * * *